United States Patent [19]

Veyrat

[11] Patent Number: 4,723,797

[45] Date of Patent: Feb. 9, 1988

[54] VALVE COUPLERS DESIGNED TO FACILITATE THE RETURN OF LOCKING BALLS TO THE LOCKING POSITION

[75] Inventor: Alain Veyrat, Ville-la-Grand, France

[73] Assignee: Parker Hannifin Corp., France

[21] Appl. No.: 865,501

[22] Filed: May 21, 1986

[30] Foreign Application Priority Data

May 21, 1985 [FR] France ............................... 85 07820

[51] Int. Cl.⁴ .............................................. F16L 37/28
[52] U.S. Cl. .................................... 285/316; 285/277; 137/614.05
[58] Field of Search .............................. 285/316, 277; 137/614.05, 614; 251/149.6

[56] References Cited

U.S. PATENT DOCUMENTS

| Re. 27,364 | 5/1972 | German ................................. 285/316 |
| 3,076,671 | 2/1963 | Freeman ............................... 285/277 |
| 4,453,449 | 6/1984 | Hollmann ............................. 285/316 |

FOREIGN PATENT DOCUMENTS 2110550 9/1972 Fed. Rep. of Germany ...... 285/316
2447530 4/1975 Fed. Rep. of Germany ...... 285/316

Primary Examiner—A. Michael Chambers
Attorney, Agent, or Firm—Joseph B. Balazs

[57] ABSTRACT

A coupler of the type provided with a male fitting (11) which can be locked in a female fitting (7') by means of locking balls (9) housed in an annular row of holes (8) located in the female fitting (7').

That part of the mobile tubular element (7) including between the annular row of holes (8) in which the locking balls (9) are housed and the nearest external shoulder (23) of the tubular element (7), which serves to support a return spring (16) is surrounded by a cylindrical bushing (24) whose inside end is provided with a flange (25) which is normally biased against the external shoulder (23) of the mobile tubular element (7), whose other end, which is normally biased against the internal tapered face (6a) of the internal rib (6) in the body (2), is internally beveled so as to provide a divergent face (26), whereby the length of the cylindrical skirt of this bushing (24) slightly exceeds the distance between the aforesaid shoulder (23) and the annular row of holes (8) housing the balls (9).

4 Claims, 4 Drawing Figures

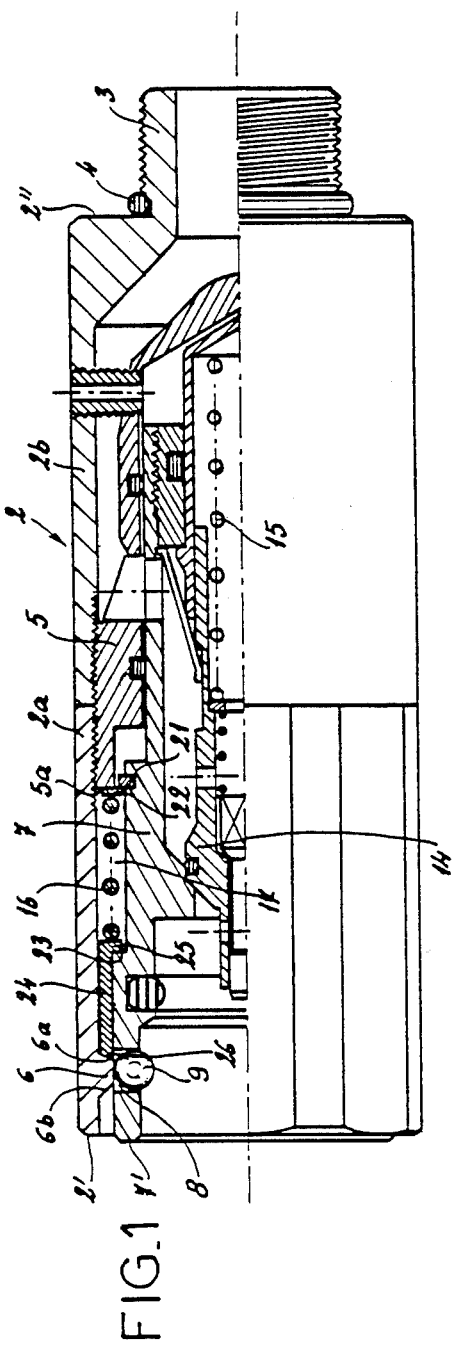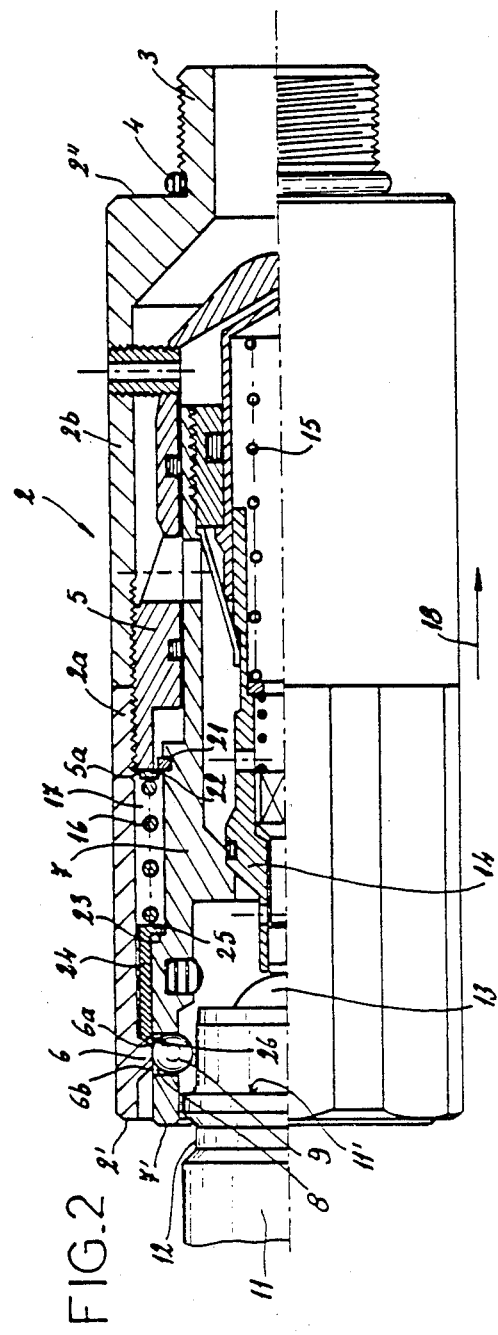

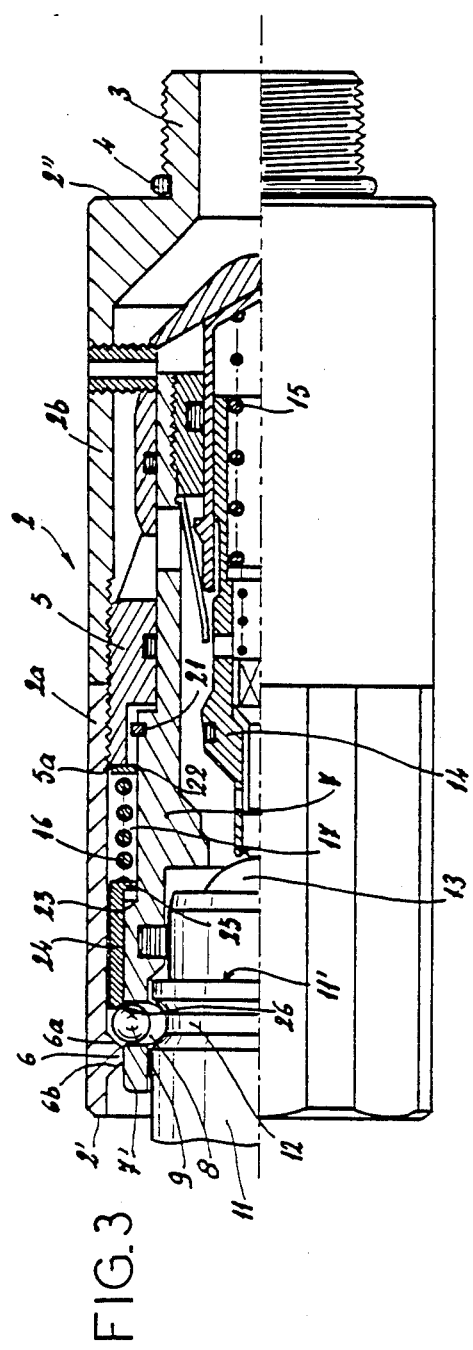
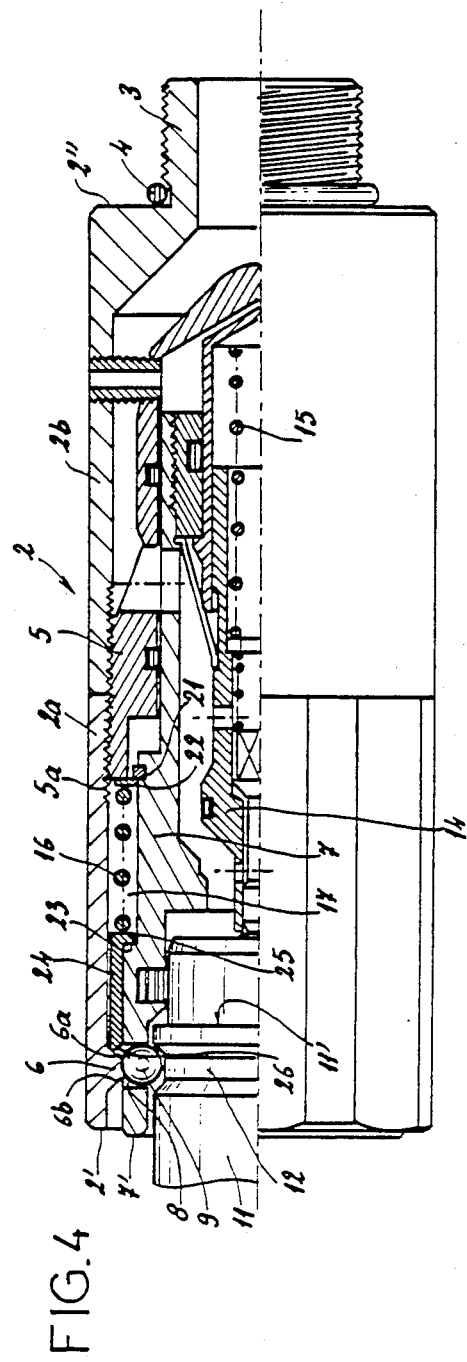

VALVE COUPLERS DESIGNED TO FACILITATE THE RETURN OF LOCKING BALLS TO THE LOCKING POSITION

BACKGROUND OF THE INVENTION

The subject of this invention is an improvement for valve couplers designed to facilitate the return of locking balls to the locking position.

The invention thus concerns the type of valve coupler which comprises an outside tubular body, one end of which is provided with a means of solid coupling to a source of fluid under pressure and which accommodates a tubular element free to move axially in both directions, whereby the front end of the inner tubular element which matches the free end of the tubular body and comprises the female fitting of the coupler, accommodates the locking balls which are housed in an annular row of holes, whereby the balls are intended to be engaged in and located by an external annular groove provided for this purpose adjacent to the end of the male coupler fitting, whereby a spring acts to return this tubular element to a stable intermediate position in which the annular row of holes in which the locking balls are housed coincides in an axial plane with a radial internal rib with tapered faces provided in the tubular body in order to maintain the balls in their locking position, that is to say in a position in which they project radially inside the bore in the mobile tubular element, whereby the latter is provided with a valve towards its rear end, which is normally maintained in a closed position by means of a spring and is designed to be withdrawn to an open position by the valve of the male fitting whenever the latter is inserted in the female fitting.

It will be easily seen that in this type of coupler, any axial movement of the inside tubular element away from its stable intermediate position will tend to move the locking balls away from the rib inside the body and will allow them to move radially outwards until they are entirely clear of the bore.

With this arrangement, the male fitting can be locked in the female fitting by simply forcing it against the pressure exerted by the return spring with which the inside tubular element is provided and against the pressure exerted by the fluid supply which acts on the valve of the female fitting; conversely, simple tractive force exerted on the aforesaid return spring alone will be sufficient to uncouple it from the female fitting.

The advantage of this type of coupler lies in the fact that it can be operated with one hand.

In known couplers of this type, the inside tubular element is maintained in its stable intermediate position with the help of a return spring coiled around the tubular element itself and which is normally compressed between two opposite external and two opposite internal shoulders, whereby the latter are at the same distance from one another as the former and the latter are provided in the bore of the body, whereby the position at which the two pairs of internal and external shoulders coincide with one another coincides as well with the locking position of the balls.

In practice and on account of manufacturing constraints, at least some of the aforesaid shoulders consist of screw collars or fitted circlips which tend to raise the cost of manufacturing and assembling such couplers. Moreover, under certain conditions, and especially when the supply fluid is at a high pressure, manual coupling becomes extremely difficult or even impossible, since the inward radial force exerted on the balls by the rear ramp of the internal rib of the tubular body requires a slight forward movement of the inside tubular element and consequently, requires the male fitting to be withdrawn somewhat, and this may occur too late, since the annular groove in the male fitting will no longer be aligned with the annular row of balls.

Furthermore, if there is any residual pressure in the user line, that is to say downstream of the male fitting, this pressure will tend to shift the balls radially outwards as soon as this valve opens, and this will prevent them from falling into the groove in the male fitting.

SUMMARY OF THE INVENTION

The purpose of the present invention is to eliminate all of these disadvantages. To this end, in the aforesaid coupler, which is of the above type, that part of the mobile tubular element included between the annular row of holes in which the locking balls are housed and the external shoulder of the tubular element which is located closest to it and which serves to support the rear end of the return spring, is surrounded by a cylindrical bushing whose inside end is provided with an internal annular flange which is normally maintained against the aforesaid external shoulder of the mobile tubular element, whose other end, which is normally maintained pressed against the tapered internal face of the internal rib in the tubular body and is provided with an internal divergent bevel, whereby the the skirt of the cylindrical bushing is slightly longer than the distance between the aforesaid shoulder and the annular row of holes in which the balls are housed.

Thus, whenever the mobile tubular element is thrust back inside the body as a result of engagement of the male fitting, the action of the balls which are pushed in a radial outward direction by the male fitting against the beveled face of the bushing, forces the latter backwards and thus causes it to retract under the force exerted by the return spring, thus allowing the balls to completely clear the bore of the mobile tubular element. Conversely, whenever the groove in the male fitting finds itself inside the row of holes in which the balls are housed, the latter cease to act on the beveled face of the bushing and the return spring will tend to bring the bushing back to the normal position, as described above, so that its beveled face will then exert a force on the balls which will tend to repel and disperse them radially inwards, which will have the effect of causing them to drop into the groove in the male fitting, without waiting for the return movement of the mobile tubular element and the consequent action on the balls of the internal tapered face of the rib inside the body.

BRIEF DESCRIPTION OF THE DRAWINGS

FIG. 1 shows a lateral view of an axial half-section showing the body of the coupler provided with its female fitting at rest prior to insertion of the male fitting;

FIG. 2 is a similar view to FIG. 1 and shows the coupler at the start of insertion of the male fitting, whereby the female fitting is still in its normal resting position;

FIG. 3 provides a similar view to FIGS. 1 and 2 and shows the coupler at the end of insertion of the male fitting, just before it is effectively locked inside the female fitting;

FIG. 4 provides a similar view to FIGS. 1-3 and shows the male and female fittings of the coupler locked together.

DETAILED DESCRIPTION OF THE INVENTION

As shown here, the coupler to which the improvement which is the subject of the present invention is applied, is a valve coupler of known type, comprising an external tubular body (2) provided with a threaded fitting (3) at its rear end (2") and with an O-ring (4) to provide a tight seal between the coupler and a source of pressurized fluid, which is not shown here.

In the example shown in the drawing, for ease of mounting the tubular body (2) consists in fact of two coaxial elements, one towards the front (2a) and the other towards the rear (2b), assembled end-to-end with an internal threaded collar (5).

Adjacent to its front end (2'), the tubular body (2) is provided with an internal radial rib (6) with one internal and one external tapered face (6a, 6b respectively), whose function will be explained later.

Inside the body (2), an internal tubular element (7) is provided which can move in either axial direction and whose front end (7'), which matches the front end (2') of the body (2), comprises the female coupler fitting and supports the locking balls (9) which are housed in an annular row of holes (8), whereby these balls are normally maintained so as to project radially inside the bore of the front end (7') of the tubular element (7) by means of the rib (6) in the body (2), the diameter of the balls (9) being greater than the thickness of the wall of the tubular element (7) adjacent to the annular row of holes (8). It should be noted that the internal radial end of each hole (8) is provided with a narrow section preventing the balls (9) from passing freely. The function of these balls is to provide a known means of locking the male fitting (11) of this coupler which can be seen in FIGS. 2-4, by engaging the male fitting (11) in an external peripheral groove (12) provided near its free end.

Both the male fitting (11) and the female fitting (7') of this coupler are associated with valves (13, 14 respectively), which are normally kept closed by means of return springs. In the drawing, only the return spring (15) of the valve (14) associated with the female fitting (7') is shown. Each of these valves (13, 14) is designed to bear on one another when the male fitting (11) is being inserted in the female fitting (7'), so that the valves are opened and remain open as long as the male fitting (11) remains inserted in the female fitting (7').

As shown in FIGS. 1, 2 and 4, a spring (16) surrounding the mobile tubular element (7) and which is thus accommodated in the annular space between the tubular element (7) and the body (2), tends to maintain the latter in a stable intermediate position in which the annular rows of holes (8) coincide axially with the rib (6) and consequently in this position the balls (9) are maintained by the rib (6) in an internal radial locking condition.

For this purpose, the return spring (16) bears on two pairs of shoulders equidistant to one another, whereby one pair of shoulders is provided on the external cylindrical face of the mobile tubular element (7), whereas the other pair of shoulders is provided on the internal cylindrical face of the tubular body (2).

The extreme inside shoulder, that is to say, the shoulder nearest to the threaded fitting (3) in the body (2) of each of these two pairs of shoulders, comprises the rear face of a circlip (21) of a known type supported by the tubular element (7) and by the front face (5a) of the aforesaid collar (5), whereby this set of shoulders serve to provide the rear support of the return spring (16). In order to support the return spring evenly on the two shoulders, a washer (22) is inserted between them and the rear end of the return spring (16).

At a fixed distance in front of the circlip (21), the tubular element (7) is provided with a rear external shoulder (23) opposite the rear shoulder formed by the circlip itself (21).

According to the improvement provided by the present invention, that part of the tubular element (7) included between the shoulder (23) and the annular row of holes (8) is provided with a cylindrical bushing (24) which is slightly longer than the distance between the shoulder (23) and the annular row of holes (8). The rear end of the bushing (24) is provided with an internal flange (25) which is normally maintained against the shoulder (23) of the tubular element (7) by the action of the return spring (16). The rear end of the bushing (24) is provided with an internal bevel so that its face is of divergent cross section (26).

When the coupler is at rest, as shown in FIGS. 1 and 2, that is to say before the male fitting (11) is inserted, under the action of the return spring (16) the flange (25) of the bushing (24) is maintained against the shoulder (23) of the tubular element (7) and the rear beveled end of the bushing (24) is maintained against the internal face (6a) of the rib (6), which, in conjunction with the bushing (24), plays the part of the second pair of shoulders associated with the tubular body (2). Thus, FIGS. 1 and 2 show the tubular element (7), which can move in either axial direction, in its stable intermediate position which corresponds to the locking position of the balls (9).

When the male fitting (11) engages in the female fitting (7'), a shoulder (11') of the same diameter as the female fitting (7') moves the mobile tubular element (7) backwards in the direction of the arrow (18) by bearing on the balls (9), which are prevented from retracting by the presence of the rib (6) of the body (2). This retraction of the tubular element (7) as a result of the force exerted by the return spring (16) in compression, has the effect of moving the row of holes (8) inside the body (2) with respect to the rib (6), thus allowing the balls (9) to retract with respect to the bore of the female fitting (7') as they are thrust radially outwards, as shown in FIG. 3. As the balls retract, they allow the male fitting (11) to engage in the female fitting (7') until the groove in the male fitting (11) is located above the annular row of balls (9).

As can be clearly seen in FIG. 3, for the tapered face (6a) of the rib (6) to be able to play its part as a return ramp for the balls (9), it is necessary that the groove (12), the male fitting (11) and the mobile tubular element (7) be retracted as soon as the groove passes the axial position of the rib (6).

As a result, in the absence of the bushing (24), there is nothing to cause the balls (9) to fall down into the groove (12) until the start of the return stroke of the tubular element (7) which allows the balls (9) to touch the return ramp formed by the internal face (6a) of the rib (6).

As indicated above, this operation might well be difficult or even impossible to perform, particularly if a considerable level of residual pressure were to persist in the feed line.

The function of the bushing (24) is to force the balls (9) to move radially inwards as as soon as the groove (12) moves directly below them.

However, as can be seen in FIG. 3, as soon as the large diameter surrounding the shoulder (11') of the male fitting (11) passes below the balls (9), the balls are thrust radially backwards and outwards on the one hand and axially in the direction of the arrow (18), on the other hand, in conjunction with the tubular element (7). In the course of these two combined movements, the balls (9) bear on the beveled face (26) of the bushing (24), causing the latter to retract against the pressure of the return spring (16) and consequently the flange (25) separates from the shoulder (23) of the tubular element (7), as shown in FIG. 3. An examination of FIG. 3 will show that the axial pressure exerted by the return spring (16) on the bushing (24) will be transmitted to the balls (9) via the beveled face (26) of the bushing (24), which will impinge in turn on the balls (9) which will be unable to retract with respect to the tubular element (7), because, since they are housed in the holes (8), any radial inward movement of the balls would cause them to drop into the groove (12) in the male fitting (11) as soon as this groove is located below them.

The same result can be obtained with even a weak spring (16). For example, with a residual pressure in the feed line of the order of 15–20 bars, a 15–20 kg spring (16) will be more than adequate.

In order to uncouple the male fitting (11) from the female fitting (7'), it is sufficient to exert tractive force on the male fitting in the opposite direction to the arrow (18), which will tend to move the tubular element (7) in the same direction and will consequently bring the annular row of balls (9) in front of the internal rib (6) in the body (2) and this will in turn allow the balls (9) to retract with respect to the bore of the female fitting (7') by moving radially outwards. The bushing (24) plays no part in this operation.

I claim:

1. A female coupling for attachment to a male coupling having a peripheral locking groove defined in part by a leading shoulder-rib, comprising:
    a tubular body having a front end and a rear end, said front end having an internal radial rib with a bevelled rear face;
    a tubular element fitted inside said tubular body and having a forwardly facing receptacle shaped for receiving a male coupling, said tubular element including a rear shoulder and an annular row of ball-retaining holes, said tubular element being axially movable with respect to said tubular body between a first position with said annular row of holes disposed radially adjacent said internal rib of said tubular body and a second position with said annular row of holes disposed to the rear of said internal rib;
    a set of locking balls disposed in said annular row of ball-retaining holes such that said rib of said tubular body forces said balls to extend inwardly from said tubular element when said tubular body and said tubular element are in said first position, and such that a leading shoulder-rib on a male coupling can force said balls to extend outwardly from said tubular element when said tubular body and said tubular element are in said second position;
    a bushing disposed between said tubular body and said tubular element and having a bevelled forward face which, together with said bevelled rear face of said internal radial rib, form an internally facing groove of internally diverging cross section, said bushing having a flange which bears upon said rear shoulder of said tubular element to engage and carry said bushing so that said bevelled forward face of said bushing and said bevelled rear face of said internal radial rib are at a sufficient distance apart to receive said locking balls in said internally facing groove as said locking balls are forced outwardly by a leading shoulder-rib on a male coupling with said tubular body and said tubular element in said second position; and
    spring means for urging said bushing axially forward to resiliently narrow said internally facing groove and move said locking balls inwardly as said tubular element and said tubular body move from said second position to said first position.

2. The device of claim 1 wherein said tubular body includes an internal spring bearing surface and wherein said spring means comprises a spring extending from said bushing flange opposite said shoulder of tubular element to said spring bearing surface.

3. The device of claim 2 wherein said tubular body and said tubular element can also axially move to a third position with said annular row of holes disposed to the front of said internal radial rib such that a leading shoulder-rib of a male coupling can force said balls to extend outwardly to release a male coupling.

4. The device of claim 3 wherein said tubular element includes a spring engaging surface radially adjacent said spring bearing surface of said tubular body in said first position and upon which said spring bears so as to compress said spring as said tubular body and said tubular element move from said first position to said third position.

* * * * *